[15] 3,662,835
[45] May 16, 1972

Livingston

[54] PHASE CHANGE METHOD

[72] Inventor: William L. Livingston, Norwood, Mass.

[73] Assignee: Factory Mutual Research Corporation, Turnpike, Mass.

[22] Filed: Apr. 14, 1970

[21] Appl. No.: 28,509

[52] U.S. Cl. ................................................. 169/1 R, 165/1
[51] Int. Cl. ................................................................ A62c 3/00
[58] Field of Search .................. 169/1; 165/1; 252/316, 3; 34/5, 9, 132, 124

[56] References Cited

UNITED STATES PATENTS

| | | | |
|---|---|---|---|
| 1,583,484 | 5/1926 | Morrison et al. | 34/5 |
| 3,229,769 | 1/1966 | Bashaw et al. | 169/1 |
| 1,980,898 | 11/1934 | Abernethy | 34/5 |
| 3,354,084 | 11/1967 | Katzer | 169/1 X |
| 3,247,171 | 4/1966 | Walker et al. | 260/79.7 X |
| 3,480,546 | 11/1969 | Bashaw et al. | 169/1 X |
| 3,398,784 | 8/1968 | Smith et al. | 165/1 |

OTHER PUBLICATIONS

Dow Chemical Co., "Gelgard Fire Control Polymer for Use by Municipal Fire Departments," Form No. 164-111-465.
Monsanto Co., "EMA - Technical Bulletin 1-261," Inorganic Chemicals Division.

*Primary Examiner*—M. Henson Wood, Jr.
*Assistant Examiner*—Thomas C. Culp, Jr.
*Attorney*—Lane, Aitken, Dunner & Ziems

[57] ABSTRACT

Imparting a phase change to liquids normally characterized by properties of Newtonian flow and internal convection by converting said liquids to a gel characterized by plastic flow and no internal convection, and exposing said gel directly or indirectly to a heat exchange medium. This method provides essentially instant initial response, minimizes convection losses, and provides phase change without total system involvement.

7 Claims, No Drawings

PHASE CHANGE METHOD

BACKGROUND OF THE INVENTION

This invention is directed to a method of imparting a phase change to a liquid material. More particularly, this invention is directed to a method of transforming a liquid normally exhibiting Newtonian flow and internal convection either to a vapor or to a solid.

The phrase "Newtonian flow" is utilized herein in its conventional sense, thus meaning flow in which the rate of movement is directly proportional to the driving force applied. The phrase "internal convection" is utilized herein to mean natural convection, that is, the transfer of heat from one point to another within a liquid by movement within the liquid wherein the movement is due entirely to differences in density resulting from differences in temperature.

When the aforementioned liquids are subjected to heating or cooling in a phase change process, convection currents are set up in the liquid adjacent the source providing the heating or cooling. As a result, the entire body of the liquid reaches a temperature approaching the phase change temperature before any phase change occurs.

Thus, unless the body of liquid being subjected to phase change is very small, or the temperature gradient very great (e.g., 2,000° F.), there is a lag time between the application of heating or cooling to said liquid and the formation of vapor or solid product. There can be energy losses due to the convection currents, whereby process efficiency is decreased. The fact that the total body of liquid reaches a temperature approaching the phase change temperature before phase change first occurs can be disadvantageous, for example, from a safety standpoint; in illustration, if the water is being vaporized, it is more dangerous to have a large body of water present at a temperature approaching 212° Fahrenheit than to have a large body of water present at room temperature with a small portion of this body being at 212° Fahrenheit.

In the present invention, the aforementioned disadvantages associated with changing the phase of Newtonian-flow, internal-convection exhibiting liquids are overcome by converting these liquids to liquids exhibiting plastic flow and no internal convection. A liquid exhibiting plastic flow requires a finite amount of push, i.e. force, applied to it before flow occurs. The threshold value of force which must be applied before any net flow occurs is often termed the "yield value" which can be measured in dynes (force) per square centimeter. Plastic flow is distinguishable from Newtonian flow in that the Newtonian flow the yield value is zero, whereas in plastic flow the yield value is greater than zero.

Methods of converting Newtonian-flow convective liquids to liquids which exhibit plastic flow and which do not exhibit internal convection are known.

In particular, Newtonian-flow, convective fluids are converted to liquids exhibiting plastic flow and no internal convection in fire-fighting methods. For example, Bashaw et al., U.S. Pat. No. 3,229,769; and Walker et al., U.S. Pat. No. 3,247,171; and applicant's co-pending application, Ser. No. 766,475, filed Oct. 10, 1968 describe the conversion of water into an ablative fluid material for fire-fighting purposes. The ablative material, when applied to a fire, permits thermal energy from the fire to be transmitted through the exposed outer surface of the material. Due to the fact that the ablative fluid material is not characterized by internal convection, the thermal energy is not transmitted completely through the ablative material, and the material adjacent the heat source is vaporized to provide fire-fighting action. In addition, since the formed ablative fluid material resists push, that is, exhibits plastic flow, it tends to remain in a blanket over the fuel array rather than to channel into a stream, whereby effective fire fighting action is achieved.

Moreover, Walker, U.S. Pat. No. 3,251,194, discloses the use of a liquid which in fact exhibits plastic flow and lack of natural convection as a material from which ice is formed for an ice-skating rink.

The present invention is directed to phase change methods which are distinct from the aforenoted fire-fighting methods and the method of the Walker patent.

BRIEF SUMMARY OF THE INVENTION

One embodiment of this invention involves converting the liquid normally characterized by Newtonian flow and internal convection to a gel characterized by plastic flow and no internal convection, and exposing the gel to a heat exchange medium with a heat-conducting solid interposed therebetween whereby phase change is effected in said liquid component of said gel. The term "heat exchange medium" is utilized herein to mean any source of heating or cooling operating on the liquid being processed, that is, operating on the liquid to which phase change is being imparted. The term "heat conducting solid" is utilized herein to mean any solid material that transmits thermal energy by conduction, for example, a metal such as steel or iron.

Another embodiment of this invention involves converting the liquid normally characterized by Newtonian flow and internal convection to a vapor by converting said liquid to a gel characterized by plastic flow and no internal convection, and before or after said conversion introducing said liquid or gel into a system maintained at least in part closed during the succeeding vaporization step, and supplying sufficient heat to said system to cause said liquid component in said gel to vaporize. In most applications of this embodiment the system is maintained substantially closed during vaporization; that is, closed but for a vapor escape route or channel.

Both of these embodiments demonstrate advantages of essentially instant initial response, minimization of energy loss by convection, and the provision of phase change without total system involvement.

DETAILED DESCRIPTION OF THE INVENTION

The liquid as used herein the term "liquid" means a material in the liquid state. It includes a material in the liquid state as a result of being at ambient conditions as well as a material in the liquid state as a result of being under the influence of high pressure and/or low temperature conditions subjected to phase change in the present invention can be any liquid which normally exhibits Newtonian flow and internal convection. Preferably, the liquid subjected to the present process is water. Other liquids which are useful for the present process include, for example, refrigerants such as freons or liquid nitrogen, mercury, or organic liquids such as alcohol.

The gel into which these liquids are converted is characterized by a three-dimensional reticulated framework of gelling agent which surrounds or imbibes the liquid which is gelled. For example, the gelling agent, that is, the surrounding or imbibing material, can be a network structure of high molecular polymer chains. The network can extend to the limiting boundaries of the liquid. Alternatively, the gel can be comprised of tightly packed discrete gel particles, each consisting of a reticulated framework of gelling agent which completely surrounds or imbibes the liquid being converted into a gel. As a result of said framework, the resulting gel exhibits plastic flow and lack of internal convection.

Gelling agents for use in converting water into a plastic-flow, non-convective gel within the scope of the present invention include, for example, cross-linked ethylene maleic anhydride, such as a material sold by the Monsanto Company under the trade-name EMA-91. Another such material which is useful is the diammonium sodium salt of EMA-91, which is sold by the Monsanto Company under the trade name EMA-94. Other materials, such as a water-swellable, cross-linked polymer sold by the B.F. Goodrich Chemical Company under the trade name Carbopol-960, are also useful, as are materials such as those described in Katzer U.S. Pat. No. 3,354,084 and Bashaw U.S. Pat. No. 3,229,769.

The specially preferred gelling agent for use herein with water is sold under the trade name Gelgard M by the Dow Chemical Company. Gelgard M is a cross-linked hydrolyzed polyacrylamide-acrylate polymer represented by the structural formula

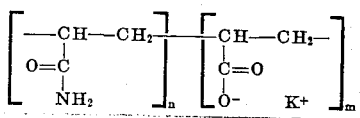

wherein $n/m$ is approximately 3, and has an average molecular weight of about 20,000. Preferably it is in particulate form, having a particle size of through 325 mesh U.S. Standard Seive Series.

In general, the gelling agents are utilized in particulate form having an average particle size ranging from through 50 mesh to through 325 mesh, preferably from through 230 mesh to through 325 mesh U.S. Standard Seive Series.

The liquid is converted into the gel by simply adding the particulate gelling agent to the liquid and admixing to uniformly distribute the gelling agent through the liquid.

The amount of gelling agent to be utilized depends upon the particular gelling agent utilized. In general, the amount of gelling agent utilized amounts to from about 0.1% to about 1.0% by weight of the liquid that is gelled; preferably it amounts to from about 0.2% to about 0.4% by weight of the liquid that is gelled.

Turning now to each of the embodiments of the present invention, the first embodiment broadly described above finds application in an ice-making system. Water is first converted into a gel characterized by plastic flow and no internal convection by the addition and admixing of the proper amount of gelling agent. The formed gel is then introduced into the icemaker, wherein it is caused to flow over surfaces of metal or like materials which are heat-conducting solids. The passage of a refrigerant heat-exchange medium along an opposite surface of said heat-conducting solid causes water in the gel to freeze, especially that water adjacent the heat-exchange surface. Because the water has been converted into a gel characterized by plastic flow and no internal convection, the water in the gel adjacent the heat-exchange surface freezes essentially instantaneously whereby increased process efficiency can be achieved. This ice-making process is very desirably carried out in a scraped-wall heat exchanger. Gel is fed along the inner surface of the exchanger wall and refrigerant is fed along the outer surface, usually countercurrently. As soon as the ice is formed on the inner surface of the exchanger wall it is scraped off by wiper blades, whereby further gel may be exposed to the heat-exchange surface.

The first embodiment broadly described hereinbefore also finds application in a fire hydrant systems. Such systems often experience blockage in cold weather when water in an operating or recently operated hydrant, its adjacent piping or a fire hose attached thereto is frozen solid due to heat exchange between the water and the ambient cold air through the system walls. The conversion of the water in the system into a gel exhibiting plastic flow and no internal convection, e.g. by injection of a proper amount of gelling agent upstream of the hydrant, eliminates the possibility of such blockage. Instead of water in the hydrant system freezing solid, only the water in the gel adjacent the system walls freezes thereby forming an insulating skin of ice along said wall. Because the total body of water in the system is not involved due to the lack of convection currents in the system, said total mass does not freeze. As a result, when the system is started or restarted, the pressure behind the liquid in the system is easily able to cause the liquid to force by any partial blockage, whereby flow is provided. When flow starts, any ice which is present is melted, whereby rated speed of material flow is quickly achieved.

The second embodiment broadly described hereinbefore can be applied, for example, in a vaporizer system. Such vaporizers are often utilized to supply steam to the atmosphere, for example, in a child's room to relieve congestion in the breathing passages of the child due to illness. Many such vaporizers are ordinarily dangerous, because they contain a reservoir of heated water, which when upset by the child, can scald and burn the child. Within the scope of the present invention this problem is overcome by admixing the water introduced into the vaporizer with a gelling agent to form a gel exhibiting plastic flow and lack of internal convection. The gel directly adjacent to the heating element of the vaporizer has its water portion converted to steam. Because of the lack of convection in the gel in the vaporizer, most of the liquid in the vaporizer is at the temperature of the water added to the vaporizer, that is, approximately room temperature; thus, upon upset of the vaporizer by the child, the child comes into contact with essentially room temperature water without serious injury occurring.

This second embodiment can also be employed in a steamturbine system. The water to be converted into steam is first converted into a gel within the scope of the present invention. Steam is produced essentially instantaneously on the application of heat to the formed gel, so that the steam turbine is started quickly, whereas long lag times are normally associated with the start-up of steam turbines. In addition, the reservoir of water from which steam is supplied to the steamturbine system contains water most of which is at room temperature, whereby the chance of injury upon explosion or other mishap is minimized.

This invention is also utilized with respect to a double-boiler system. The water in the bottom portion of the double boiler is converted into a gel within the scope of this invention. Because the gel exhibits lack of convection, steam production begins essentially immediately as soon as heat is applied to the bottom of the pot, whereby the double boiler functions more quickly than ordinarily.

The present invention is also applicable to the quenching of metals which have previously been heat-treated. Water is commonly utilized as a quenching medium. In the application of the present invention, the water is converted into a gel within the scope of the present invention previous to the quenching treatment. The heated metal is dipped into the formed gel in the quenching process. Water in the gel adjacent to the metal is immediately converted into steam, which dissipates. As a result of the quenching, the temperature of the metal is reduced. However, the quenching bath water is not heated up more than minimally, because of the lack of convection currents in the formed gel. Thus, the quenching bath presents considerably less of a safety hazard, since the water in it, after the quenching treatment, is still at a relatively low temperature.

The following examples further illustrate the phase change method of the present invention.

EXAMPLE 1

In a fire-fighting operation, a conventional fire hose is attached to a fire hydrant which is connected to a 6-inch pipeline. In operation of the hydrant and fire hose, Gelgard M is introduced into the 6-inch line upstream from the hydrant to provide gelled water characterized by plastic flow and no internal convection emitting from the hydrant and hose. Gelled water is forced through the 6-inch line into the hydrant at the rate of 10 feet per second. Gelgard M is introduced into the 6-inch line so as to provide a concentration of Gelgard M in the formed gelled water of 0.2% by weight.

The ambient temperature is minus 10° Fahrenheit. The gelled water is discharged through the fire hose at a rate of about 30 feet per second onto a fire. During the course of the fire-fighting operation, the fire appears to have been extinguished and the flow of gelled water is shut-off. Fifteen minutes later the fire rekindles, the gelled water flow is restarted. Gelled water emits from the hose and rapidly attains a speed of 30 feet per second so that the fire is extinguished.

In another case, plain water is pumped through the fire hose onto the fire instead of gelled water. Just as in the case of gelled water, the hydrant is shut-off and then turned on 15 minutes later after the fire rekindles. In this case, contrary to the gelleddwater case, no fluid emits from the fire hose, since the water has frozen solid during the 15-interval, thereby blocking the hydrant and/or fire hose.

On the other hand, in the gelled-water case only partial blockage has occurred, since an insulating skin of ice has formed near the walls of the hydrant and/or hose due to the fact that the gelled water does not convect. When flow is restarted, the pressure behind the gelled water is easily able to cause the liquid in the hydrant to force its way by any partial blockage so that flow is provided. When the flow starts, the ice which is present is melted and the rated speed of material flow of 30 feet per second is quickly achieved.

EXAMPLE 2

A vaporizer (sold under the trade name Prac-T-Kal) having a 1 gallon capacity is filled with water at 27° C. (80.6° F.). Gelgard M (0.16 pounds) is added to the water in the vaporizer with stirring to provide a gel which exhibits plastic flow and lacks internal convection. The gel contains 0.2% Gelgard M by weight of water. The cover containing the nozzle is then applied to the vaporizer, and the electric cord of the vaporizer is then plugged into an electrical outlet. Steam production begins within 10 minutes. Since approximately a 10-minute time period is required for the heating element in the vaporizer to achieve its operating temperature, steam production response is essentially instantaneous. After the vaporizer has been operated for 1 hour, the liquid in it is at a temperature of 30° C. (86° F.). At the 2-hour mark the liquid in it is at a temperature of 32° C. (90° F.). Since water at these temperatures does not burn or scald, the risk of injury occurring upon mishap is minimized.

On the other hand, if ordinary water at an initial temperature of 18° C. (64° F.) is utilized in the vaporizer without the addition of gelling agent, the temperature of the water in the vaporizer after it has been operated for 1 hour is 50° C. (122° F.) and the temperature at the 2-hour mark is 60° C. (140° F.). Water at these temperatures can cause burning or scalding upon upset of the vaporizer by a child.

When in the above examples other gelling agents, for example, equal weights of EMA-91 or EMA-94 are substituted for the Gelgard M, equal results of quick response and lack of total system involvement are achieved.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method for imparting a phase-change to a portion of a liquid normally characterized by properties of Newtonian flow and internal convection, said method comprising the steps of (a) converting said liquid to a gel having plastic flow and no internal convection, and (b) exposing said gel to a heat exchange medium with a heat conducting solid interposed therebetween whereby phase-change is effected in a portion of said liquid in said gel adjacent said heat conducting solid.

2. The method of claim 1 wherein said liquid is water and the water is converted into said gel by admixing gelling agent, the amount of said gelling agent ranging from about 0.1% to about 1.0% by weight of the water in said gel.

3. The method of claim 2 wherein the gelling agent is Gelgard M.

4. A method of converting a liquid normally characterized by properties of Newtonian flow and internal convection to a vapor, said method comprising the steps of (a) converting said liquid to a gel having plastic flow and no internal convection, (b) before or after said gel conversion step introducing said liquid or said gel into a system, and (c) supplying sufficient heat to said system, maintained at least in part closed, to cause said liquid in said gel exposed to said heat to vaporize.

5. The method of claim 4, wherein the system referred to in step (c) is maintained substantially closed during vaporization.

6. The method of claim 4 wherein said liquid is water and the water is converted into said gel by admixing gelling agent, the amount of said gelling agent ranging from about 0.1% to about 1.0% by weight of the water in said gel.

7. The method of claim 6 wherein the gelling agent is Gelgard M.

* * * * *